April 14, 1925.  1,533,632
F. BUTORAC
AUTOMATIC DERAIL SIGNAL
Filed May 29, 1924
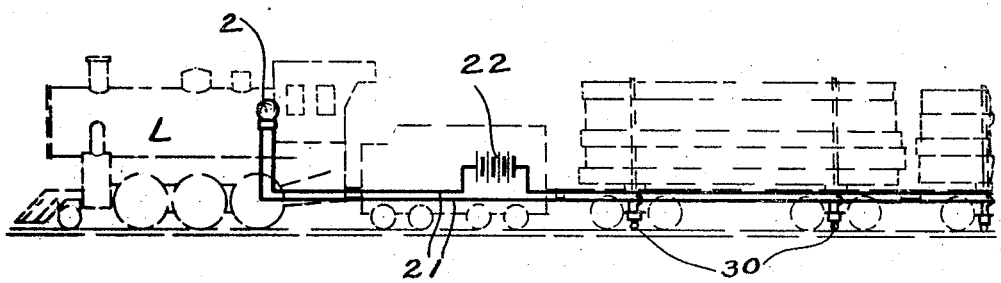
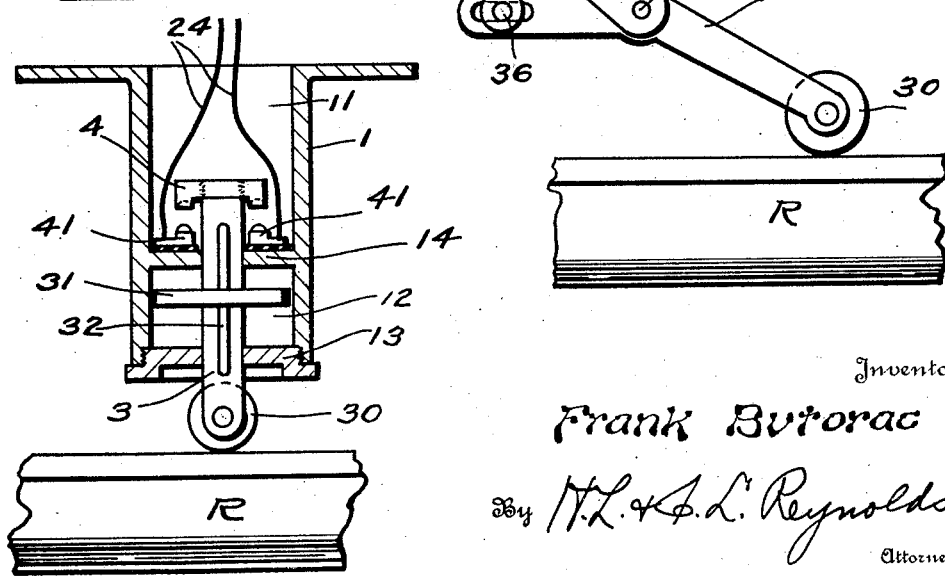
Inventor
Frank Butorac
By W. L. & A. L. Reynolds
Attorneys Patented Apr. 14, 1925.

1,533,632

UNITED STATES PATENT OFFICE.

FRANK BUTORAC, OF SEATTLE, WASHINGTON.

AUTOMATIC DERAIL SIGNAL.

Application filed May 29, 1924. Serial No. 716,641.

*To all whom it may concern:*

Be it known that I, FRANK BUTORAC, a subject of the Kingdom of Yugoslavia, and resident of the city of Seattle, in the county of King and State of Washington, have invented certain new and useful Improvements in Automatic Derail Signals, of which the following is a specification.

My invention relates to devices which are intended to operate automatically to give a signal at the instant a railroad car, or any truck or wheel thereof, jumps the track, in order that the engineer may be warned and may stop the train before further damage is done.

It may often happen that a single wheel or a single truck of a car will jump the rail and run along on the ties for a considerable distance without the engineer in his cab becoming aware of this. While such accidents may occur upon the best lines, they are of most common occurrence on lines where the road bed may be somewhat rough or where the rails may be defective, and where the line is crooked and tortuous, as, for example, in logging railroads, which are often of a somewhat temporary character and which deteriorate rapidly. When such an accident occurs, the wheel or truck which is off the track may strike some obstruction which will throw it back on again without damage, or it may finally cause the derailment of the car and the wreck of the train.

My invention is particularly designed as a signal system to automatically give instant warning to the engineer as soon as a wheel starts to jump the track, so that brakes may be applied and the train brought immediately to a stop, the probability of a wreck being largely averted.

It is a further object of my invention to provide control means for such a signal system which may be conveniently applied to the trucks of a car adjacent the wheels, and which will certainly and automatically operate to send a signal through the signaling circuit, but which, during normal operation of the car, will not operate to send such a signal.

As such devices placed near the rail and near the wheels, are liable to accumulate dust and dirt, it is a further object of my invention to provide means whereby the entrance of dust and dirt to its interior may be avoided, yet which will permit free and easy actuation of the control device.

My invention comprises those novel parts and combinations thereof which are shown in the accompanying drawings, described in the specification and particularly defined by the claims terminating the same.

In the accompanying drawings I have shown my invention in the form which is now preferred by me.

Figure 1 is an elevation of a train showing my system comprising my invention installed therein.

Figure 2 is an axial section through the control switch and casing forming part of my invention, illustrating the preferred form.

Figure 3 is a similar section showing a modification.

Essentially the system comprises a plurality of control switches enclosed in casings 1 and each connecting to a trunk line 21 leading to a signal 2, as a light or bell installed in a cab of the locomotive L, and, of course, including a suitable source of current such as the battery 22. On each car are installed as many of the control switches within their casings 1 as may be required. Ordinarily I have found it only necessary to employ a single control switch for each pair of wheels, and have, therefore, placed the casings 1 upon the trucks of the car between the various pairs of wheels. In this position they are close to the rail and close enough to the wheels so that as a wheel flange rises to ride over the rail, a rail follower such as the roller 30 is permitted to drop by gravity, thus to control the switch which is operatively connected thereto.

I have shown the switch in the preferred form as comprising a pair of fixed switch members 41 supported upon a partition 14 within the casing 1 and insulated therefrom, and a bridge member 4 which is carried upon the upper end of a vertical shaft or column 3, this column extending through and being guided in the partition 14 and through a second partition 13 which forms another guide therefor, spaced from the partition 14. At its lower end the shaft 3 carries the rail-contacting roller 30. Between the partitions 14 and 13 and secured upon the shaft 3 I have mounted a collar 31 which serves as a stop, by contacting with the partitions 13 and 14, to limit vertical movement of the shaft 3, and which extends outward to nearly contact with the inner walls of the chamber 12 within the casing to prevent passage of dust past this collar 31. A key 32 upon the column 33 prevents rotation of the column relative to the casing 1.

In the modified form shown in Figure 3 the rail-contacting roller is supported upon the end of a bell-crank lever 33, pivoted to the bottom of the casing 1 at 34. This lever 33 connects with a vertical rod 35 guided in the partitions 14 and 13, through a pin and slot connection 36. In this case the fixed contacts 41 are supported in an insulating base 42 supported within the casing above the bridge member 4 which is supported upon the upper end of the rod 35. In this form, as the casing 1 is raised, the roller 30 drops, raising the rod 35 and making contact between the bridge 4 and the two contact points 41. In the form shown in Figure 2, however, raising of the casing 1 permits the shaft 3 to drop, bringing the bridge 4 downward upon the contact points 41. The branch leads 24 from the contact points 41 connect each such control switch into the trunk lines 21, and thus each switch is connected into the circuit including the battery 22 and the signal 2.

The form shown in Figure 2 will operate satisfactorily with the car to which it is attached moving in either direction, whereas in the form shown in Figure 3 the roller 30 should extend rearwardly of the casing 1. In this form, therefore, I have mounted the casing 1 in a swivel coupling 15, whereby upon reversal of the car's movement the arm 30 may be swung around to extend rearwardly.

It will be evident from the above description that as soon as any wheel or truck of any car in the train rises from the rail, the casing 1 which is adjacent thereto will also rise and the corresponding roller 30 will drop, inasmuch as it tends always to contact by gravity with the rail R. Such movement will cause the switch 4, 41, to close and this will complete the circuit through the signal 2, thus immediately indicating to the engineer that a wheel has left the track. It will be noted that in the form shown in Figure 2 the fixed contact points 41 are slightly coned or domed, while the bridge member 4 has corresponding recesses, this being to enable any dust which may leak through into the upper chamber 11 of the casing 1 to slide off the domed contact points 41, thus to make a more perfect and certain contact between them and the bridge member 4.

What I claim as my invention is:

1. An automatic derail signal comprising, in combination, an electrically energized signal, a circuit including said signal, a normally open switch in said circuit, and means adjacent a wheel, normally in contact with the track and operable as the wheel leaves the track, to close said switch.

2. An automatic derail signal comprising, in combination, an electrically energized signal, a circuit including said signal, a normally open switch in said circuit, and means positioned adjacent a wheel and controlled by contact with the rail to maintain said switch open, and operable by gravity as the wheel leaves the rail to close said switch.

3. In combination with complemental and relatively movable switch members, a member operatively connected to the movable switch member and normally supported adjacent the wheel of a car in position to ride upon the rail, to maintain said switch members separated, said member being adapted to drop by gravity as the wheel leaves the rail, to bring said switch member into contact.

4. In an automatic derail signal, in combination, a casing adapted to be positioned adjacent a car wheel and the rail, fixed and movable switch members supported therein, a shaft guided for vertical movement in said casing, said shaft being operatively connected to the movable switch member, and said shaft being of a length normally to bear upon the rail and to maintain said switch members separated when so bearing, and to drop by gravity to close said switch as the said wheel leaves the rail.

5. In an automatic derail signal, in combination, a casing adapted to be positioned adjacent a car wheel and the rail, fixed and movable switch members supported therein, a shaft guided for vertical movement in said casing, said shaft being operatively connected to the movable switch member, and said shaft being of a length normally to bear upon the rail and to maintain said switch members separated when so bearing, and to drop by gravity to close said switch as the said wheel leaves the rail, and a stop collar upon said shaft to limit vertical movement of said shaft.

6. In a control switch of the character described, a casing, fixed and movable switch members supported therein, a non-circular shaft vertically movable in said casing, a pair of vertically spaced guides in said casing engaging said shaft, a rail-contacting roller journaled in the lower end of said shaft, and a stop-collar upon said shaft between the guides and adapted to contact therewith to limit vertical movement of the shaft.

7. In a control switch of the character described, a casing, apertured horizontal partitions therein dividing said casing into an upper and lower chamber, fixed and movable switch members in said upper chamber, a shaft in said lower chamber, said shaft extending upward through the apertures in said partitions into said upper chamber, said shaft and the movable switch member being operatively connected, a collar upon said shaft within the lower chamber and lying adjacent the wall thereof to exclude dust, and a rail-contacting member carried by the lower end of said shaft and adapted, when riding upon the rail, to maintain said movable switch member raised from contact with the fixed members.

Signed at Seattle, King County, Washington, this 20th day of May 1924.

FRANK BUTORAC.